United States Patent [19]

Ingram

[11] 4,244,501
[45] Jan. 13, 1981

[54] SLIDABLE BRACKET FOR LUGGAGE RACK

[75] Inventor: Charles E. Ingram, Warren, Mich.

[73] Assignee: Four Star Corporation, Troy, Mich.

[21] Appl. No.: 4,317

[22] Filed: Jan. 18, 1979

Related U.S. Application Data

[63] Continuation-in-part of Ser. No. 836,966, Sep. 27, 1977, Pat. No. 4,132,335.

[51] Int. Cl.$^3$ ............................................. B61D 47/00
[52] U.S. Cl. .................................................... 224/324
[58] Field of Search ............... 224/309, 321, 324, 325, 224/326; 280/179 R; 248/214, 220.2, 222.1, 222.3, 288 B, 295, 298, 499; 105/482

[56] References Cited

U.S. PATENT DOCUMENTS

| | | | |
|---|---|---|---|
| 2,925,236 | 2/1960 | Cook et al. ...................... | 248/214 X |
| 4,106,680 | 8/1978 | Bott ..................................... | 224/324 |
| 4,132,335 | 1/1979 | Ingram ............................. | 105/482 X |

Primary Examiner—Steven M. Pollard
Attorney, Agent, or Firm—Reising, Ethington, Barnard, Perry & Brooks

[57] ABSTRACT

A bracket for association with an article carrier, such as a luggage carrier is adapted for sliding adjustment or positioning in a carrier track. The bracket includes a coin or screwdriver operated locking mechanism for locking the bracket anywhere along the length of the track wherein unauthorized adjustment of the bracket is prevented. The bracket may include suitable openings which receive tie-down straps or the like. The bracket is, also, contemplated as including suitable projections for detachably mounting a cross-strap thereto, to serve as a vehicle associated luggage rack, ski rack, or article carrier.

8 Claims, 4 Drawing Figures

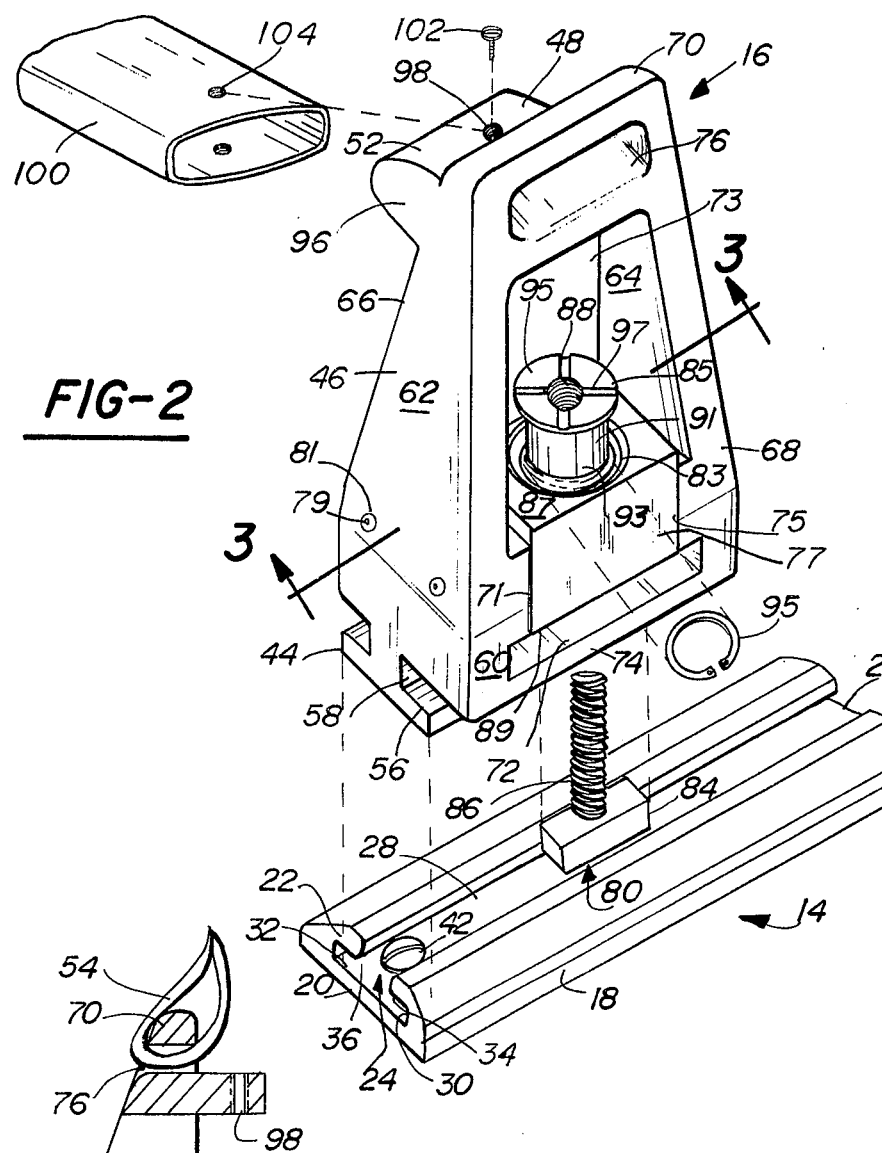
FIG-2
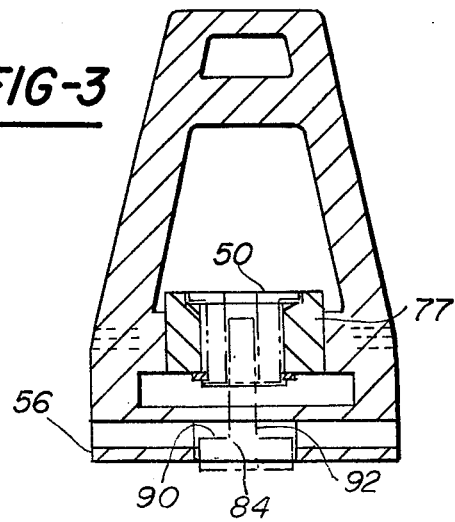
FIG-3
FIG-4

1

SLIDABLE BRACKET FOR LUGGAGE RACK

CROSS REFERENCE TO RELATED APPLICATIONS

This application is a continuation-in-part application of copending patent application Ser. No. 836,966 filed Sept. 27, 1977, now U.S. Pat. No. 4,132,335, for a "Slidable Bracket for Article Carrier," the disclosure of which is hereby incorporated by reference.

BACKGROUND OF THE INVENTION

I. Field of the Invention

The present invention pertains to an adjustable bracket for article carriers. More particularly, the present invention pertains to an adjustably positionable bracket for vehicle-related article carriers. Even more particularly, the present invention concerns adjustably positionable brackets for vehicle-associated luggage racks, ski rack, or other article carriers, having a locking means that is operated by means of a coin or screwdriver preventing the unintentional adjustment of the bracket.

II. Prior Art Statement

In the above-referred to copending application there is disclosed a vehicle associated article carrier, such as a luggage rack, ski rack, or the like which incorporates certain slidably adjustable brackets which are variably positionable along the length of a slotted track formed in an associated slat of the article carrier.

The brackets of the copending application, generally, comprises an upper section which is disposed above the slat, a lower section which is engageable with the track and slidable therewithin and means for urging a member into locking engagement with a base formed in the track. A review of the application indicates that an external manually operable element such as a rotatable disc, or clasp is employed to urge the aforesaid member into locking engagement. The deployment of the manually operable element lends the bracket susceptible to unauthorized movement with the potential of damage to articles carried by the article carrier when the person securing the bracket lacks the strength in his fingers necessary to properly secure the bracket. The present invention, as will subsequently be detailed seeks to overcome this problem.

STATEMENT OF RELEVANT ART

To the best of applicant's knowledge, the following is believed to be the prior art most closely related to the present invention:

U.S. Pat. Nos. 3,677,451, 3,375,365, 3,165,353, 3,064,868, 2,988,253, 2,783,367, 3,828,993, 2,753,095, 3,902,641, 2,914,231, 2,628,123, 2,499,136, 3,719,313, 3,468,460.

as well as the copending application hereinabove referred to.

SUMMARY OF THE INVENTION

In accordance with the present invention, there is provided an adjustably positionable bracket for article carrier, wherein the bracket cannot be moved without the use of a coin or screwdriver. The bracket hereof, generally, comprises:

- means for variably, adjustably positioning the bracket along a track provided in an article carrier;
- an upper section interconnected to the positioning means, the upper section comprising means for receiving the ends of a tie-down strap or similar device for securing an article to the bracket, the upper section, optionally, incorporating means for detachably securing a cross-strap thereto; and
- a coin or screwdriver operated locking means for locking the bracket in position.

As contemplated by the practice of the present invention, the bracket hereof comprises a slide plate or base adapted to be slidingly disposed in a track or channel formed in the article carrier. The base comprises the means for variably, adjustably, positioning the bracket. The upper section includes an opening through which is laced a tie-down strap or the like. In an alternate embodiment of the present invention, the upper section incorporates a projection to which a cross-strap is detachably mounted. In a further embodiment of the present invention, the upper section comprises the opening to receive the tie-down strap as well as the cross-strap mounting projection.

The locking means hereof includes a key which is threadably secured to a rotatable collar and which extends through the positioning means. The collar is rotatable by means of a removable coin or screwdriver which mates with and engages a coin or screwdriver engaging depression in the center of the collar. As the collar is rotated in a first direction, the key is urged into engagement with the base of the track to lock the bracket in position. Rotation of the collar in the counter direction disengages the key from the track base to permit movement of the bracket.

In a preferred embodiment of the present invention the bracket thereof is slidably mounted in a vehicle mounted article carrier slat having a track or channel formed therein.

For a more complete understanding the present invention reference is made to the following detailed description and accompanying drawing. In the drawing, like reference characters refer to like parts throughout the several views, in which:

BRIEF DESCRIPTION OF THE DRAWINGS

FIG. 2 is an enlarged, perspective view of the bracket from the preferred embodiment of the present invention;

FIG. 3 is a cross sectional view taken longitudinally through the collar in FIG. 2 along line 3—3; and FIG. 4 is a cross-sectional view of the bracket hereof taken transversely through the collar in FIG. 2.

DESCRIPTION OF THE PREFERRED EMBODIMENT

Figure 1:
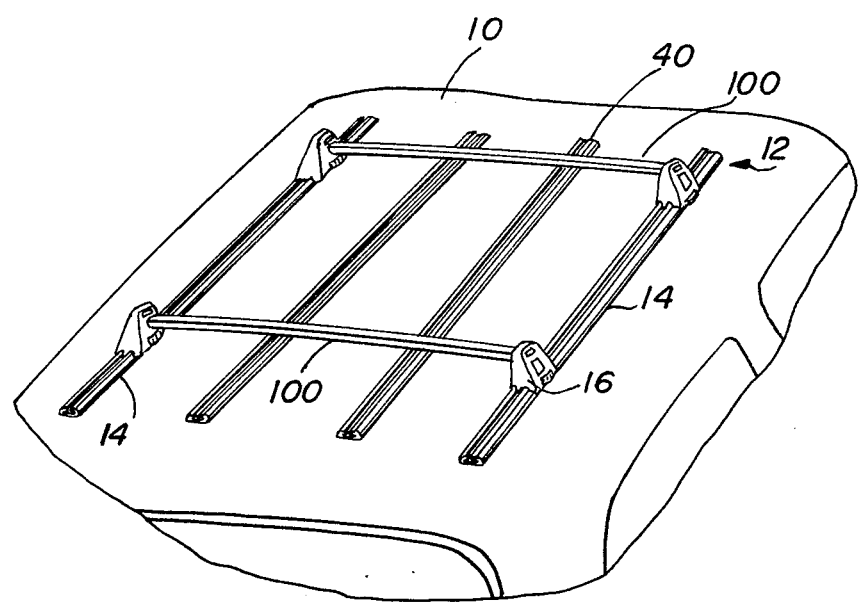
FIG. 1 is a broken, perspective view of a vehicular associated article carrier incorporating a preferred embodiment of a bracket in accordance with the present invention.

Now, and with reference to the drawing, there is depicted therein a bracket in accordance with the present invention as well as an article carrier incorporating the bracket hereof. The bracket hereof, generally, comprises an adjustably positionable bracket, wherein unauthorized adjustment of the bracket is prevented, which includes:

(a) A base for variably adjustably positioning the bracket along the extent of an article carrier;
(b) an upper section interconnected to the base, the upper section comprising means for receiving an article retainer;

(c) a support body nestingly received within the base and fixedly attached thereto; and (d) means for releasably locking the bracket in position, the locking mechanism being coin or screwdriver operated preventing unauthorized adjustment of the bracket.

The present invention further contemplates the inclusion therewith of means for detachably mounting an article carrier cross-strap between a pair of opposed brackets on either side of the vehicle roof.

Furthermore, and at the outset, it should be noted that, as used herein and in the appended claims, the term "article carrier" contemplates a luggage rack, ski rack, bicycle rack, or similar type of vehicle-related or associated device. As is known to the skilled artisan, such devices, ordinarily, contemplate a plurality of spaced apart slats which support a load or article disposed thereon. Such devices, also, adopt and incorporate side rails, and stationary and/or movable cross-straps where appropriate. If required, stanchions are utilized to support the side rails and stationary cross-straps. The article carriers are, usually, mounted to either the vehicle roof or trunk lid or deck. In the practice hereof, it is to be understood that the present invention is applicable to all such article carriers so long as the carrier, per se, can receive the bracket as is detailed subsequently.

Referring, now, to the drawing and in particular FIGS. 1-4, there is depicted therein a preferred embodiment of the present invention. In accordance herewith, there is provided a vehicle body section 10 having an article carrier 12 disposed and affixed thereon (FIG. 1). The article carrier depicted in the drawing comprises a plurality of slats 14. The slats 14 are longitudinally extending members which are affixed to the vehicle body by any suitable mode, such as threaded fasteners 42 (FIG. 2) or the like.

As defined by the present invention, the article carrier 12 comprises at least one slat 14 adapted to receive a tie-down bracket 16 in accordance with the present invention. The slat 14 contemplated for use herein, generally, comprises a member 18 having a substantially planar lower surface 20. The surface 20 is designed to be contiguous with the vehicle body when affixed thereto. The upper surface 22 of the slat 14 is provided with bracket-receiving means 24. The bracket receiving means 24 comprises a channel 26. The channel or track 26 in a preferred embodiment includes a longitudinal slot 28 formed substantially along the extent of the upper surface and is formed downwardly therefrom. The slot 28 is in registry with and opens up into an enlarged guidepath 30. The guidepath 30 includes a bottom wall 32 which defines a seat for the bracket 16 in a manner to be described subsequently. The junction between the slot 28 and the guidepath 30 is defined by a pair of opposed inwardly directed shoulders 34, 36, respectively. As will subsequently be described, the wall 32 and the shoulders 34, 36 cooperate to retain the bracket 16 in fixed position when the bracket is placed in a locked position.

It should be noted that the slat 14 can comprise, a formed sheet metal member, a solid or hollow interior extrusion or the like, as desired. The criticality to be attached to the slat is that it be provided with the longitudinally extending channel 26. Also, the slat 14, further, comprises means 38 for limiting the longitudinal movement of the bracket 16 in the track 26. For example, the limiting or stop means 38 can comprise an end cap 40 (FIG. 1) journalled onto one end of the strap 14.

Alternatively, an obstruction such as an oval head screw 42 (FIG. 2) can be disposed in the channel 26, as shown. The obstruction disrupts the path of travel of the bracket to prevent passage therepast.

As heretofore, noted the slat 14 receives the bracket 16. The bracket 16 comprises (a) a base section 44 for adjustably positioning the bracket along the extent of the track 26, (b) an upper section 46 integral with the base, the upper section comprising means 48 for receiving an article retainer, generally, denoted at 48, and (c) means for releasably locking the bracket in position. The bracket 16 hereof may, also, comprise means 52 for detachably mounting an article carrier tie-down 54 thereto.

With more particularity, the base section 44 is slidably moveable in the track 26. Thus, the base section is configured analogously to the track 26. The base section includes a lower body 56 analogously configured to, but being dimensionally slightly less than that of the guidepath 30. This dimensioning enables the lower body to be slid, with facility, along the length of the guidepath.

A shank 58 projects upwardly from the lower body 56 and is integrally fromed therewith. The shank 58 is disposed substantially perpendicular to the lower body and centrally thereof. The shank 58 is coextensive with the lower section along the longitudinal extent thereof. The shank 58 has a width slightly less than that of the slot 28 and projects thereabove, as shown.

It is to be appreciated that the base defines means for variable adjustably positioning the bracket, per se, along the extent of the track.

The upper section 46 is integrally formed with the base section 44 and is united therewith at the junction of the shank 58 with the lower end of the upper section 46. The upper section is substantially equal in length to the base. As shown in the drawing, the upper section has an irregular configuration and comprises means, generally, denoted at 48 for receiving an article retainer.

More specifically, the upper section includes a lower end 60. The lower end 60 is configured analogously to that of the upper surface of the slat 14. This is done for load bearing distribution over the entire width of the slat. Upstanding from the lower end are a pair of opposed, side walls 62, 64, respectively, and a pair of opposed end walls 66, 68 respectively. The side walls and end walls are integrally formed to define a unitary structure for the upper section. A top wall 70 encloses the structure.

As clearly shown in FIGS. 2 and 3, the side wall 64 has a frontal opening 72 formed therein which opens into communication with the interior 73 of the upper section. A ledge 74 extends between the end walls and is disposed parallel to the top wall 70.

The frontal opening 72 has at the lower end of the side walls 62 and 64, a pair of spaced apart parallel vertical surfaces 71 and 75, forming a part of the side walls 62 and 64.

The parallel vertical surfaces 73 and 75 slidingly receive a support body 77 which is fixedly attached to the bracket by a plurality of set screws 79 threadingly received in a plurality of apertures 81 formed in the lower end. The support body 71 has a vertical through bore 83 at its center to slidingly receive a rotatable collar 85. The bottom wall 89 of the support body 77 is spaced above the top surface of the ledge 74 and the top wall 87 of the support body 77 is spaced above the apertures 81. The support body 77 is substantially the same width as the bracket lower end 60 where they join. The through bore 83 is countersunk and chanfered at its upper end to accommodate the head of the rotatable collar 85. The collar 85 when in place has its upper end flush with the top wall 87. The rotatable collar 85 has a body 91 that is slidingly received by the through bore 83, the body 91 extends past the bottom wall 89 of the support body 77 a distance. The bottom wall 89 forming an upper wall for the frontal opening 72 the groove 93 around the periphery of the body 91 has its upper edge flush with the support body bottom wall 89. The bottom wall 89 is spaced above the bottom wall 74 providing space to install a retaining ring 95. The groove 93 is configured to receive the retaining ring 95 to prevent vertical movement of the rotatable collar 85 when ring 95 is in place. The collar 85 has an enlarged head 95 at its upper end to engage the counter sunk and chamfered upper end of the bore 83 in a slidable manner. A coin or screwdriver engageable depression 77 is disposed in the top of the enlarged head 95. The collar 85 has a threaded aperture 88 vertically through its center to threadingly receive a threaded shaft 86 of a key 80, the function of which will be explained more fully hereinbelow.

The means 48 comprises an opening 76 (FIGS. 2 and 4) formed in the top wall 70. The opening 76 is an elongated slot or the like extending through the upper section 46. An article retainer, such as a tie-down strap 54 is insertable through the opening 76 and foldable back upon itself through the opening 72, as shown. Alternately, the tie-down strap 54 can be attached to the top wall 70 by any suitable means including rivets, threaded fasteners, adhesive bonding or the like. Furthermore, the means 48 can be defined by a loop integral with the top wall, or other strap retaining or receiving means. Thus, it is to be perceived that an article, such as a bicycle, luggage, or the like can be placed upon the carrier 12, and tied down with the straps 54 which are threaded through the openings 76 provided in the brackets 16. The brackets 16 are adjustably positionable by sliding same in the tracks formed in the slats.

Referring, again, to the drawing, as heretofore, noted, in order to set the bracket in any position along the length of the associated track, the present invention further comprises means 50 for releasably locking the bracket 16 in position. The locking means 50, generally, comprises a locking key 80 and a rotatable collar 85 threadably interconnected to the wedge.

The key 80 is defined by a said solid 84 and a threaded shaft 86. The shaft 86 has a threaded profile formed about the periphery thereof. The shaft 86 is integrally formed with the solid body 84 and projects outwardly therefrom.

The collar 85 has a pair of coin or screwdriver engaging depressions 97 across its top and projecting thereacross. The threaded aperture 88 in the collar 85 threadingly engages the shaft 86. The threaded profile of the shaft is complimentary to that of the periphery of the threaded aperture 88. Thus, the shaft and the bore 88 cooperate to define means for threadably interconnecting the collar 85 and the key 84.

In mounting the locking means a pair of registering openings are utilized. As shown in FIGS. 3 and 4, the lower body 56 has an upwardly directed keyway 90 formed therein. The keyway has a height substantially equal to that of the body 84 to enable the body to nest therewithin. The shank 58 is provided with a bore 92 through which the shaft 86 projects. The bore 92 is in registry with the bore 83 formed in the support body 77.

It is to be appreciated that the locking means is mounted by inserting the key into the keyway and collar 85 into the bore 83, installing the ring 95, aligning the shaft with the threaded aperture 88 and, threadably, interconnecting the collar 85 and the shaft 86 by means of a removable coin or srewdriver which mates with the coin or screwdriver engaging depressions 97.

The locking mechanism functions by emplacing the bracket in the track and sliding same to the desired position. Thereafter, the collar is rotated in a first direction with a coin or screwdriver. Rotation of the collar urges the key downwardly into engagement with the bottom wall 32 of the track guidepath 30. This wedges and locks the lower body between the bottom wall 32 and the opposed shoulders 34,36. Rotation of the collar with a coin or screwdriver in the opposite direction withdraws the wedge into the keyway, thereby releasing the wedge from engagement with the bottom wall 32. Thus, the bracket is free to be slid in the track.

Referring, again, to the drawing and in particular FIGS. 2 and 4, it will be noted that projecting laterally outwardly from the top wall 76 and substantially perpendicular thereto is a cross-strap mounting member 96. The mounting member 96 has a threaded throughbore 98 formed therethrough. The member 96 is dimensioned and configured to receive an end of a cross-strap 100 thereon. A fastener, such as a bolt 102 threadably interconnects the cross-strap 100 to the bracket 16 via an opening 104 formed in the cross-strap and which registers with the throughbore 98. Thus, and in accordance with the embodiment of the invention, the bracket, also, defines means for positioning a cross-strap for a luggage rack or similar article carrier. The cross-strap can also be attached to the bracket by other mounting means including a threaded rod extending from the end of the cross-strap to engage a mating threaded aperture in the upper wall 70. The configuration of the remainder of the upper section can adopt either of the article retainer-receiving means described hereinabove with or without the cross-strap mounting member.

It is to be readily appreciated that the means for locking is directly incorporated into the base section hereof. Thus, as the collar 85 is rotated in a first direction, the lower portion of key 80 is urged into engagement with the bottom wall of the guidepath thereby locking the bracket in position. Rotation of the collar 85 in the opposite direction withdraws the lower portion from its engagement with the guidepath bottom wall.

It should be readily understood that movement of the bracket along the track will vary the tension of a strap threaded therethrough and secured to an article to be transported, such as a bicycle or the like.

It is to be appreciated that there has been described herein a tie-down bracket for an article carrier that can be readily locked in any desired position in a track formed in a slat and no unauthorized movement of the bracket is permitted without the use of a coin or screwdriver for locking and unlocking the bracket.

Having thus described my invention what I claim is:
1. A tie-down bracket for an automotive vehicle mounted article carrier comprising:
    a lower base section engageable with a track formed in the article carrier;
    an upper section interconnected to the base section;
    a bore formed in the upper section to nestingly receive a rotatable collar;

a rotatable collar nestingly disposed in the base the collar having a coin or screwdriver engaging depression formed therein, a lower end of the collar projecting into an opening formed in the bracket, the lower end having a groove formed therearound proximate the opening formed in the bracket, the collar having an enlarged head to prevent axial downward displacement thereof;

means for selecting locking the bracket in the track responsive to the rotation of the collar, comprising:

a key member releasably engaging the track;

a threaded shaft integrally formed with the key member and projecting upward therefrom, the shaft extending through a bore formed in the base section, the bore in registry with the bore of the upper section;

a ring disposed in the groove to prevent upward movement of the collar.

2. The bracket of claim 1 which further comprises:
a cross-strap mounting member disposed on the upper section.

3. The bracket of claim 1 wherein:
the upper section is provided with a first opening therethrough, the opening defining the means for receiving a strap and being threadable through the first opening.

4. The bracket of claim 1 wherein the base section is provided with a recess in registry with the bore, the key member being nestable within the recess when the disc is rotated to release the key for movement of the bracket.

5. In combination with an article carrier for an automotive vehicle of the type comprising an elongated slat adapted to be affixed to the vehicle exterior the slat having a longitudinally extending track formed therein, a tie-down bracket therefore, the bracket comprising:

a base section engageable with the track formed in the slat, the base being slidable along the extent of the track;

an upper section interconnected to the base section and disposed above the slat;

a vertically open bore formed in the upper section to nestingly receive a rotatable collar;

a collar nestingly disposed with the bore and contained entirely with the perimeter of said upper section;

means for preventing vertical axial movement of the collar;

means for selectively locking the bracket in the track responsive to rotation of the collar;

means for rotating said collar with a coin or screwdriver to releasably lock said bracket in a preselected position along the length of a slot formed in the track, and wherein the collar is positioned in the bore, such that it is rotatable only with a coin or screwdriver, wherein the base is released from engagement from the track, and collar being rotatable by means of a coin or screwdriver engaging a mating depression in the collar.

6. The combination defined in claim 5 wherein said means for releasably locking the bracket comprises:

a key member for releasably engaging the track;

a threaded shaft integrally formed with the key member and projecting upward therefrom, the shaft extending through a bore in the base section, the bore in communication with the bore formed in the upper section; and the collar being enclosed by the bore in the upper section threadably interconnected to the shaft, the collar having a coin or screwdriver engaging desression formed therein.

7. The combination of claim 5, wherein the collar has an enlarged head having a diameter greater than that of the bore, the enlarged head defining means for preventing downward axial displacement of the collar.

8. The combination of claim 5 wherein:
a lower end of the collar projects into a frontal opening formed in the bracket, the collar having a groove formed therearound proximate the frontal opening, the combination further including a retaining ring disposed in the groove which prevents upward axial displacement of the collar.

* * * * *

UNITED STATES PATENT AND TRADEMARK OFFICE
CERTIFICATE OF CORRECTION

PATENT NO. : 4,244,501

DATED : January 31, 1981

INVENTOR(S) : Charles E. Ingram

It is certified that error appears in the above—identified patent and that said Letters Patent is hereby corrected as shown below:

Column 2, line 36 (Specification page 5, line 9) after "understanding" insert --of--.

Column 4, line 24 (Specification page 9, line 15) "fromed" should be --formed--.

Column 5, line 2 (Specification page 11, line 3) "chanfered" should be --chamfered--.

Column 5, line 50 (Specification page 12, line 18) "said solid" should be --solid body--.

Column 6, line 8 (Specification page 12, line 14) "srewdriver" should be --screwdriver--.

Column 8, line 4 (Claim 5, line 12) "with" should be --within--.

Column 8, line 16 (Claim 5, line 21) "and" should be --said--.

Column 8, line 30 (Claim 6, line 10) "desression" should be --depression--.

Signed and Sealed this

Twenty-eighth Day of April 1981

[SEAL]

Attest:

RENE D. TEGTMEYER

Attesting Officer

Acting Commissioner of Patents and Trademarks